United States Patent
Ly-Gagnon et al.

(10) Patent No.: US 11,425,669 B2
(45) Date of Patent: Aug. 23, 2022

(54) DISTRIBUTED AND SYNCHRONIZED BLUETOOTH SCAN ACROSS MULTIPLE DEVICES FOR FASTER BLUETOOTH DISCOVERY

(71) Applicant: Apple Inc., Cupertino, CA (US)

(72) Inventors: Yann Ly-Gagnon, San Francisco, CA (US); Arun Unkn, Cupertino, CA (US); Chen Ganir, San Jose, CA (US); Duy N. Phan, Los Gatos, CA (US); Langford M. Wasada, Poway, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 17/032,635

(22) Filed: Sep. 25, 2020

(65) Prior Publication Data

US 2022/0104151 A1 Mar. 31, 2022

(51) Int. Cl.
*H04W 56/00* (2009.01)
*H04W 76/15* (2018.01)
*H04W 8/00* (2009.01)
*H04W 4/80* (2018.01)

(52) U.S. Cl.
CPC .......... *H04W 56/001* (2013.01); *H04W 4/80* (2018.02); *H04W 8/005* (2013.01); *H04W 76/15* (2018.02)

(58) Field of Classification Search
CPC ...... H04W 56/001; H04W 76/15; H04W 4/80
See application file for complete search history.

(56) References Cited

U.S. PATENT DOCUMENTS

| | | | |
|---|---|---|---|
| 2015/0382304 A1* | 12/2015 | Park | H04W 56/001 455/41.2 |
| 2016/0323863 A1* | 11/2016 | Park | H04W 4/023 |
| 2017/0285788 A1* | 10/2017 | Park | H04W 52/267 |
| 2018/0007499 A1* | 1/2018 | Lee | H04W 76/10 |

\* cited by examiner

*Primary Examiner* — David Bilodeau
(74) *Attorney, Agent, or Firm* — Sterne, Kessler, Goldstein & Fox P.L.L.C.

(57) ABSTRACT

Some aspects of this disclosure include apparatuses and methods for implementing a synchronized short range communication protocol scan mechanism across multiple devices. Some aspects relate to an electronic device including a transceiver configured to communicate based on a short range communication protocol and a processor communicatively coupled to the transceiver. The processor receives one or more parameters from a peripheral electronic device and determines, based at least on the one or more parameters, one or more synchronization parameters. The processor further transmits the one or more synchronization parameters to the peripheral electronic device. The one or more synchronization parameters can include at least a scan offset associated with the peripheral electronic device.

20 Claims, 7 Drawing Sheets

DISTRIBUTED AND SYNCHRONIZED BLUETOOTH SCAN ACROSS MULTIPLE DEVICES FOR FASTER BLUETOOTH DISCOVERY

BACKGROUND

Field

This disclosure generally relates to techniques for implementing a synchronized Bluetooth™ scan mechanism across multiple devices.

Related Art

Bluetooth™ devices can use advertising and scanning (and/or paging and scanning) to find each other and establish connections. A listening Bluetooth™ device is configured to scan different channels to determine whether any of the channels include advertising packets and/or packets addressed to the listening Bluetooth™ device. A tradeoff exists between how fast the listening Bluetooth™ device can connect to another Bluetooth™ device and the battery life of the listening Bluetooth™ device. For example, for the listening device to connect faster to the other device, the listening device scans the channels more often and therefore more battery of the listening device is used. On the other hand, to preserve the battery, the listening device can scan the channels less often, which can result in added delay in connecting to the transmitting device.

If multiple devices belong to a group and would like to connect a remote device, each device in the group will be scanning independently from the other devices of the group. In this case, the scanning windows of the devices of the group will overlap that will result in inefficiencies in finding the remote device and in inefficiencies of power budgets at the devices of the group.

SUMMARY

Some aspects of this disclosure include apparatuses and methods for implementing a synchronized short range communication protocol scan mechanism across multiple devices. For example, some aspects of this disclosure include apparatuses and methods for implementing a synchronized Bluetooth™ scan mechanism across multiple devices. It is noted that although some examples of this disclosure are discussed with respect to a Bluetooth™ protocol, a Bluetooth™ Low Energy protocol, or a Bluetooth™ Low Energy Long Range protocol, the aspects of this disclosure can be applied to any short range communication protocol and/or other communication protocols.

By distributing and synchronizing the short range communication protocol (such as, but not limited to, Bluetooth™) scanning across multiple devices, the connection time between the multiple devices and a remote device can be reduced. Additionally, or alternatively, the power budget at the multiple devices can also be reduced.

Some aspects relate to an electronic device. The electronic device includes a transceiver configured to communicate based on a short range communication protocol and a processor communicatively coupled to the transceiver. The processor is configured to receive one or more parameters from a peripheral electronic device and determine, based at least on the one or more parameters, one or more synchronization parameters. The processor is further configured to transmit the one or more synchronization parameters to the peripheral electronic device. The one or more synchronization parameters can include at least a scan offset associated with the peripheral electronic device.

In some examples, the one or more parameters can include at least one of a usage indicator associated with the peripheral electronic device, a power indicator associated with the peripheral electronic device, a priority indicator associated with the peripheral electronic device, scan configuration associated with the peripheral electronic device, or a clock drift associated with the peripheral electronic device.

In some examples, to determine the one or more synchronization parameters, the processor is configured to determine the one or more synchronization parameters based at least on the one or more parameters received from the peripheral electronic device and one or more parameters of the electronic device.

In some examples, the scan offset associated with the peripheral electronic device includes a time period measured from a beginning of a scan interval to a beginning of a scan window of the peripheral electronic device. In some examples, the scan offset associated with the peripheral electronic device includes a time period measured from a beginning of a scan interval to a beginning of a scan window of the peripheral electronic device. In some examples, the one or more synchronization parameters further includes at least one of a scan interval or a scan window.

In some examples, the processor is further configured to determine whether a condition for re-synchronization has occurred and in response to determining that the condition has occurred, determine updated one or more synchronization parameters.

In some examples, the processor is further configured to receive, using the transceiver and during a scan window associated with the electronic device, one or more messages from a second electronic device. The processor is further configured to determine information associated with the second electronic device and communicate the determined information with the peripheral electronic device.

In some examples, the one or more messages from the second electronic device includes one or more advertising messages and the information associated with the second electronic device includes an offset between the one or more advertising messages.

In some examples, the electronic device and the peripheral electronic device belong to a group of electronic devices determined based on a policy.

Some aspects relate to a method. The method includes receiving, by an electronic device, one or more parameters from a peripheral electronic device. The method further includes determining, by the electronic device and based at least on the one or more parameters, one or more synchronization parameters. The method also includes transmitting, by the electronic device, the one or more synchronization parameters to the peripheral electronic device. The one or more synchronization parameters can include at least a scan offset associated with the peripheral electronic device. The electronic device and the peripheral electronic device belong to a group of electronic devices determined based on a policy.

Some aspects relate to a non-transitory computer-readable medium storing instructions. When the instructions are executed by a processor of a electronic device, the instructions cause the processor to perform operations including receiving one or more parameters from a peripheral electronic device. The one or more parameters can include at least one of a usage indicator associated with the peripheral electronic device and/or a power indicator associated with the peripheral electronic device. The operations further include determining, based at least on the one or more parameters, one or more synchronization parameters. The operation also include transmitting the one or more synchronization parameters to the peripheral electronic device. The one or more synchronization parameters includes at least a scan offset associated with the peripheral electronic device.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
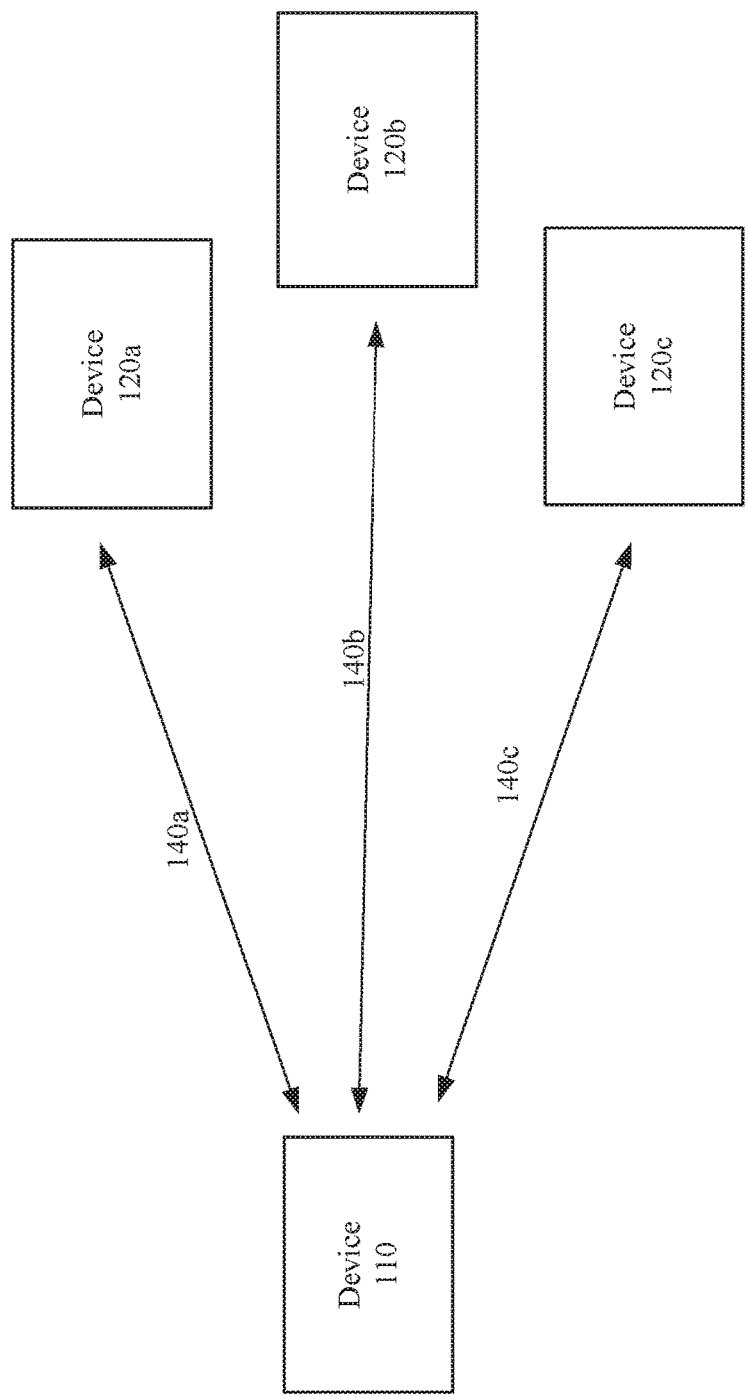
FIG. 1 illustrates an example system implementing a synchronized short range communication protocol scan mechanism across multiple devices, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a synchronized Bluetooth™ scan mechanism across multiple devices. It is noted that although some examples of this disclosure are discussed with respect to a Bluetooth™ protocol, a Bluetooth™ Low Energy protocol, or a Bluetooth™ Low Energy Long Range protocol, the aspects of this disclosure can be applied to any short range communication protocol and/or other communication protocols.

FIG. 1 illustrates an example system 100 implementing a synchronized short range communication protocol scan mechanism across multiple devices, according to some aspects of the disclosure. Example system 100 is provided for the purpose of illustration only and does not limit the disclosed aspects. System 100 may include, but it not limited to, a group of devices 120a-120c (also collectively referred to herein as device 120 or a plurality of devices 120) and a device 110. The plurality of devices 120a-120c and device 110 may include, but are not limited to, wireless communication devices, smart phones (e.g., user equipment), laptops, desktops, tablets, personal assistants, monitors, multimedia devices (e.g., televisions), human interface devices, speaker devices, headphone devices, wearable devices, medical sensors, gaming devices, vehicle multimedia centers, and the like.

The connections 140a-140c are illustrated in FIG. 1 as possible connections between the plurality of devices 120a-120c and device 110. Additionally, or alternatively, based on the disclosure herein, a person of ordinary skill in art will understand that each of the plurality of devices 120a-120c can form one or more connections with other devices 120a-120c. As one example, device 120a can form a connection (not shown in FIG. 1) with either or both of the devices 120b and 120c. One or all of the connections 140a-140c (and other connections between other devices 120a-120c) may be wireless and may include, but are not limited to, a cellular network connection (such as, but not limited to, Universal Mobile Telecommunications System (UMTS), the Long-Term Evolution (LTE), connection based on 3G/4G/5G networks), a wireless local network connection (such as but not limited to Institute of Electrical and Electronics Engineers (IEEE) 802.11 standard, which is sometimes referred to as Wi-Fi), or based on Bluetooth™ protocol, Bluetooth™ Low Energy protocol, or a Bluetooth™ Low Energy Long Range protocol (from the Bluetooth Special Interest Group of Kirkland, Wash.), or any other wireless connections using standardized and/or proprietary protocols. In some aspect, one, multiple, or all of connections 140a-140c may be implemented as wired connections between each of the respective devices.

According to some aspects, the plurality of devices 120a-120c belong to a group of devices. The group of devices 120a-120c can be defined based on a policy. In a non-limiting example, the policy can define the group of devices 120a-120c as the devices that belong to one user. For example, the group of devices 120a-120c can include a personal smart phone, a corporate smart phone, a smart watch, and a wireless headphone belonging to the one user. As another non-limiting example, the policy can define the group of devices 120a-120c as the devices that belong to two or more users in a family. As another example, the policy can define the group of devices 120a-120c as the devices associated with a firm, corporation, company, etc. As another example, the policy can define the group of devices 120a-120c as the devices associated with a cloud account. As another example, the policy can define the group of devices 120a-120c as the devices associated with a key (or other information) of device 110. As another example, the policy can define the group of devices 120a-120c as the devices associated with a key (or other information) of a group of devices that are associated with each other. It is noted that these policies are provided as examples and the aspects of this disclosure are not limited to these examples. Other policies can be used to group the plurality of devices 120a-120c for implementing a synchronized short range communication protocol scan mechanism across the plurality of devices 120a-120c.

As a non-limiting example, the group of devices 120a-120c can establish wireless connections 140a-140c, respectively, with device 110. The wireless connections 140a-140c can be based on short range communication protocols, such as, but not limited to, any of the Bluetooth™ protocol, a Bluetooth™ Low Energy protocol, or a Bluetooth™ Low Energy Long Range protocol. To establish the connection 140a for the first time, devices 120a and 110 may perform a pairing operation. According to some aspects, the paring operation may include an advertising and/or a paging from device 110 and scanning from device 120a. For example, device 110 can send one or more advertising messages (e.g., one or more advertising packets) such that device 120a can detect the one or more advertising messages during device 120a scanning and can find and connect to device 110. Additionally, or alternatively, device 110 can transmit one or more page messages (e.g., with an identifier of device 120a) and device 120a can scan and detect the one or more page messages.

If each one of the plurality of devices 120a-120c that wants to connect device 110 scans independently from the other devices of the plurality of devices 120a-120c, the scanning windows of the plurality of devices 120a-120c may overlap, which will result in inefficiencies in finding device 110. The overlap of the scanning windows can also result in inefficiencies of power budgets at the plurality of devices 120a-120c and/or a power budget across the plurality of devices 120a-120c. Some aspects of this disclosure include apparatuses and methods for implementing a synchronized Bluetooth™ scan mechanism across the plurality of devices 120a-120c to reduce the connection time and the power budget for the connections. For example, by spreading the scan windows across the plurality of devices 120a-120c, the plurality of devices 120a-120c can detect (and connect to) device 110 faster and with using less energy and power. Additionally, the scan windows spread across the plurality of devices 120a-120c can have different lengths for different devices based on, for example, the power of the respective device.

According to some aspects, one device in the group of devices 120a-120c (e.g., device 120a) can operate as a central device to implement the synchronized Bluetooth™ scan mechanism across the group of the devices 120a-120c. In one example, central device 120a can detect the presence of peripheral devices 120b and 120c. In a non-limiting example, central device 120a can detect the presence of peripheral devices 120b and 120c based on messages (e.g., advertising messages) transmitted by the peripheral devices 120b and 120c. However, the aspects of this disclosure are not limited to this example, and central device 120a can detect the presence of peripheral devices 120b and 120c using other methods and messages. Also, although three devices 120a-120c are illustrated as part of the group of devices, the group can include any number of devices.

According to some aspects, after detecting the presence of peripheral devices 120b and 120c, central device 120a can receive one or more parameters from peripheral devices 120b and 120c. In one example, central device 120a can establish a connection with one or more of peripheral devices 120b and 120c to receive the one or more parameters. Central device 120a can determine one or more synchronization parameters based, at least, on the received one or more parameters. Central device 120a can communicate the one or more synchronization parameters to peripheral devices 120b-120c. After communicating the one or more synchronization parameters to peripheral devices 120b-120c, central device 120a can disable the connection with peripheral devices 120b and 120c. In some examples, the connection between central device 120a and peripheral devices 120b and 120c can include a short range connection (e.g., Bluetooth™), a cellular network connection, and/or a wireless local network connection.

According to some aspects, the one or more parameters that central device 120a receives from peripheral devices 120b and 120c can include, but is not limited to, peripheral devices' usage indicator, peripheral devices' power indicator, peripheral devices' priority indicator, peripheral devices' scan configuration, peripheral devices' clock drift, and the like. It is noted that aspects of this disclosure are not limited to these examples, and the one or more parameters that central device 120a receives from peripheral devices 120b and 120c can include less parameters and/or other parameters.

In some examples, the peripheral device's usage indicator can include a parameter indicating how much the peripheral device is being used. For example, peripheral device's usage indicator can specify whether the peripheral device is being highly used (e.g., is being used for a phone call, to stream video, etc.) or the peripheral device is being moderately used. In some examples, the peripheral device power indicator can include a parameter indicating how much power (e.g., battery) is left at the peripheral device.

In some examples, peripheral device's priority indicator can include a parameter indicating the priority of the peripheral device and/or the priority of one or more applications/programs that are being run on the peripheral device. In some examples, the peripheral device's scan configuration can include scan configuration set for the peripheral device. For example, the scan configuration can include scan window (e.g., a time period that the peripheral device can scan for advertising messages and/or for pages). The scan configuration can also include scan interval (e.g., a time period between scan windows).

In some examples, the peripheral device's clock drift (e.g., measured in parts per million (ppm)) can indicate how much peripheral device's clock can drift. In some examples, the synchronization between the devices in the group of devices 120a-120c can make the devices 120a-120c to have a reliable clock. In one example, if devices 120a-120c do not exchange their clock drift, devices 120a-120c can assume a predetermined value for the clock drift (e.g., in a non-limiting example, 500 ppm).

According to some aspects, after receiving the one or more parameters from peripheral devices 120b-120c, central device 120a can determine one or more synchronization parameters based, at least, on the received one or more parameters. For example, depending on the usage indicator, power indicator, priority indicator, scan configuration, clock drift and the like received from each of peripheral devices 120b-120c, similar parameters for central device 120a, the number of devices in the group of devices 120a-120c, and/or other parameters, central device 120a can determine one or more synchronization parameters to synchronize the scan mechanism across the plurality of devices 120a-120c. According to some aspects, the one or more synchronization parameters can indicate for each device in the plurality of device 120a-120c when and for how long to scan.

According to some aspects, the one or more synchronization parameters can include a scan offset for each of the plurality of devices 120a-120c. In some examples, central device 120a can determine a scan offset specific for each one of the plurality of devices 120a-120c. The scan offset can include a time period measured with respect to the beginning of a scan interval such that device 120 can open its scan window after that scan offset. In some examples, the scan offsets are determined such that the scan windows of the plurality of devices 120a-120c do not overlap in time.

Additionally, or alternatively, the one or more synchronization parameters can include one or more scan intervals. For example, central device 120a can determine one or more scan intervals for the plurality of devices 120a-120c. For example, central device 120a can determine a first scan interval for central device 120a, a second scan interval for peripheral device 120b, and/or a third scan interval for peripheral device 120c. Alternatively, central device 120a can determine its scan interval and each of the peripheral devices determines its scan interval. In some examples, the scan intervals are the same for each device in the group of devices 120a-120c. In some examples, scan intervals are different for each device in the group of devices 120a-120c.

Additionally, or alternatively, the one or more synchronization parameters can include one or more scan windows. For example, central device 120a can determine one or more scan windows for the plurality of devices 120a-120c. For example, central device 120a can determine a first scan window for central device 120a, a second scan window for peripheral device 120b, and/or a third scan window for peripheral device 120c. Alternatively, central device 120a can determine its scan window and each of the peripheral devices determines its scan window. In some examples, the scan windows are the same for each device in the group of devices 120a-120c. In some examples, scan windows are different for each device in the group of devices 120a-120c. In some examples, peripheral devices are responsible to set their respective scan window and/or scan interval based on the scan offset to avoid their respective scan windows colliding with the scan window of central device 120a and/or other peripheral devices.

After determining the one or more synchronization parameters, central device 120a can communicate the one or more synchronization parameters to peripheral device 120b-120c to synchronize the scan mechanism across the plurality of devices 120a-120c. In some examples, the one or more synchronization parameters can also include central device 120a's clock drift. In some examples, central device 120a can communicate all the scan offsets to all the devices in the group of devices 120a-120c. In these example, each device in the group of devices 120a-120c identifies its scan offset and the scan offsets associated with other devices in the group of devices 120a-120c.

According to some aspects, the synchronization between the group of devices 120a-120c (e.g., determining and communicating the one or more synchronization parameters to synchronize the scan mechanism across the plurality of devices 120a-120c as discussed above) can include a dynamic synchronization. In other words, the plurality of devices 120a-120c can re-synchronize based, at least, on a predetermined condition. In a non-limiting example, the group of devices 120a-120c can perform the synchronization process discussed above at predetermined times. In a non-limiting example of 500 ppm for clock drift, the synchronizations can happen at, for example, but not limited to, every 100 seconds such that the clock drift between devices 120a-120c are still in synchronization. In a non-limiting example, the synchronization can assume a 50 ms resolution and 500 ppm drift. However, other values for the resolution and drift can be used. For example, the resolution can be reduced to perform the synchronization more often or the resolution can be increased to perform the synchronization less often. In another example, if central device 120a and peripheral devices 120b-120c exchange their clock drift, the clock drifts can be used to determine the times for synchronization.

In some examples, the re-synchronization can be initiated by central device 120a. Additionally, or alternatively, the re-synchronization can be initiated by one or more of peripheral devices 120b-120c. In some examples, a table stored in a database can include the one or more parameters sent by peripheral device 120b-120c to central device 120a, the one or more synchronization parameters, the time(s) of last synchronization(s), and the like. In some examples, the table stored in the database can include the list of device 120a-120c and/or other information associated with these devices.

According to some aspects, the re-synchronization process can be triggered by other conditions. In a non-limiting example, if one or more devices leaves the group of devices 120a-120c and/or one or more devices are added to the group of devices 120a-120c, the re-synchronization process can be triggered. In another non-limiting example, if central device 120a can no longer perform the re-synchronization process, another device in the group of devices 120a-120c can be selected as the central device and/or can perform the re-synchronization process. The aspects of this disclosure are not limited to these examples and other conditions can be used for dynamic synchronization and re-synchronization between the group of devices 120a-120c.

According to some aspects, after synchronization (or re-synchronization) between the group of devices 120a-120c, the group of devices 120a-120c can efficiently detect and connect to device 110. As a non-limiting example, central device 120a can detect (e.g., receive and analyze) one or more advertising messages from device 110 during its scan window. In this example, central device 120a can further establish a connection with device 110. Continuing with this examples, central device 120a can inform peripheral devices 120b-120c of the detection of device 110 and/or information associated with device 110 such that peripheral devices 120b-120c can more efficiently detect and/or connect to device 110. For example, central device 120a can determine advertisement interval associated with device 110, and using, at least, the scan offsets and/or scan windows of peripheral devices 120b-120c can share the advertisement interval associated with device 110 with peripheral devices 120b-120c. In this example, peripheral devices 120b-120c can save power by optimally opening their scan windows based on the information they have received from central device 120a to receive, for example, advertising message(s) from device 110.

Figure 2:
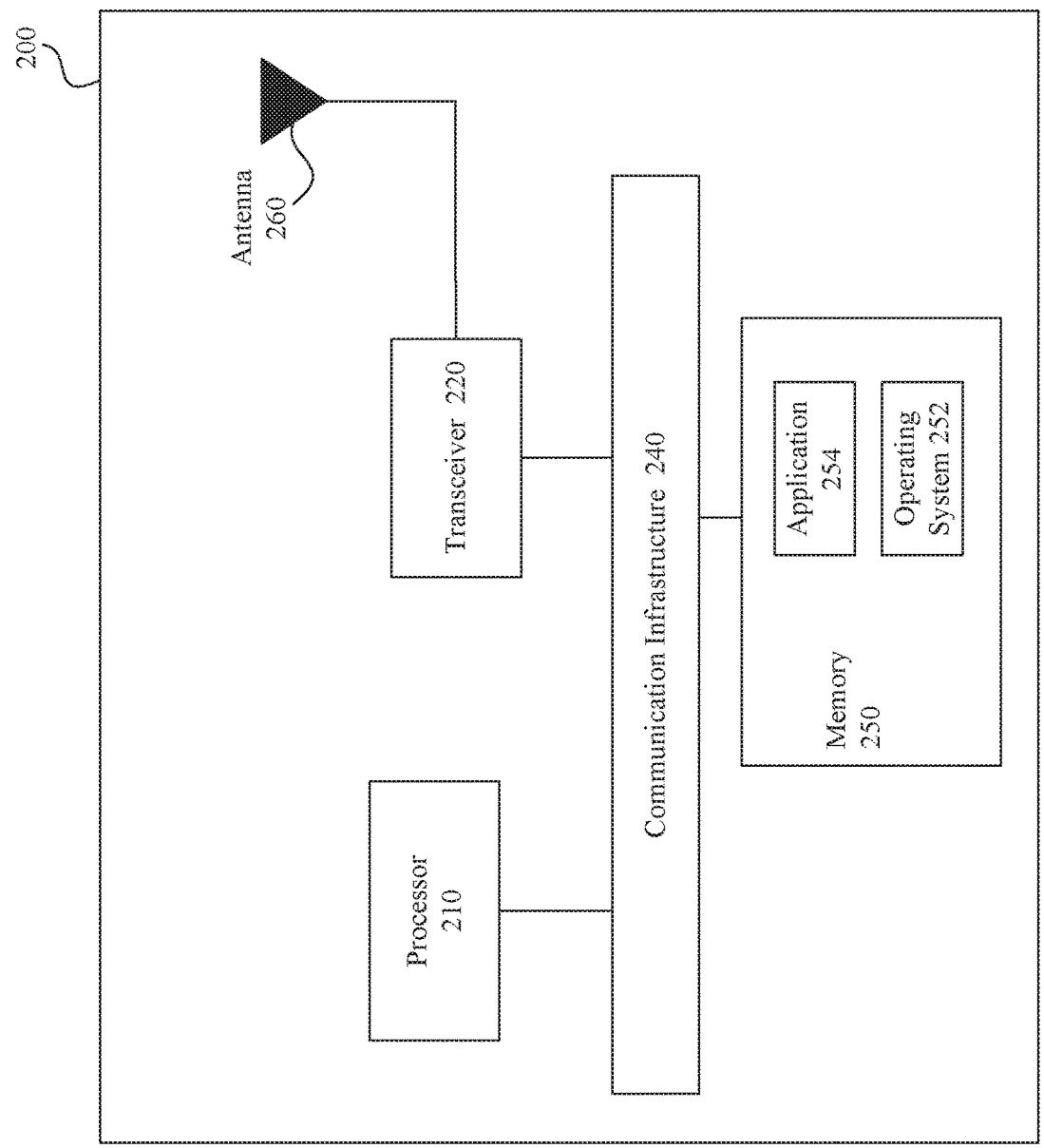
FIG. 2 illustrates a block diagram of an example wireless system of an electronic device implementing the synchronized short range communication protocol scan mechanism across multiple devices, according to some aspects of the disclosure.

FIG. 2 illustrates a block diagram of an example wireless system 200 of an electronic device implementing the synchronized short range communication protocol scan mechanism across multiple devices, according to some aspects of the disclosure. System 200 may be any of the electronic devices (e.g., devices 110 and 120) of system 100. System 200 includes processor 210, one or more transceivers (e.g., transceiver 220), communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, gaming application(s), health applications, one or more applications associated with a vehicle, and/or other user applications.

System 200 can also include communication infrastructure 240. Communication infrastructure 240 provides communication between, for example, processor 210, transceiver 220, and memory 250. In some implementations, communication infrastructure 240 may be a bus. Processor 210 together with instructions stored in memory 250 performs operations enabling wireless system 200 to implement the synchronized short range communication protocol scan mechanism across multiple devices as described herein. Additionally, or alternatively, transceiver 220 performs operations enabling wireless system 200 to implement the synchronized short range communication protocol scan mechanism across multiple devices as described herein.

Transceiver 220 transmit and receive communications signals that support the synchronized short range communication protocol scan mechanism across multiple devices, according to some aspects, and may be coupled to antenna 260. (Herein, transceivers can also be referred to as radios). Antenna 260 may include one or more antennas that may be the same or different types. Transceiver 220 allow system 200 to communicate with other devices that may be wired and/or wireless. In some examples, transceiver 220 can include processors, controllers, radios, sockets, plugs, buffers, and like circuits/devices used for connecting to and communication on networks. According to some examples, transceivers 220 includes one or more circuits to connect to and communicate on wired and/or wireless networks.

According to some aspects of this disclosure, transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

In some examples, transceiver 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Additionally, or alternatively, transceiver 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. Additionally, transceiver 220 can include one or more circuits (including a WLAN transceiver) to enable connection(s) and communication over WLAN networks such as, but not limited to, networks based on standards described in IEEE 802.11.

According to some aspects of this disclosure, processor 210, alone or in combination with computer instructions stored within memory 250, and/or transceiver 220 implements the synchronized short range communication protocol scan mechanism across multiple devices as discussed herein. As discussed in more detail below with respect to FIGS. 3-6, processor 210 can implement the synchronized short range communication protocol scan mechanism across multiple devices of FIGS. 1 and 2.

Figure 3:
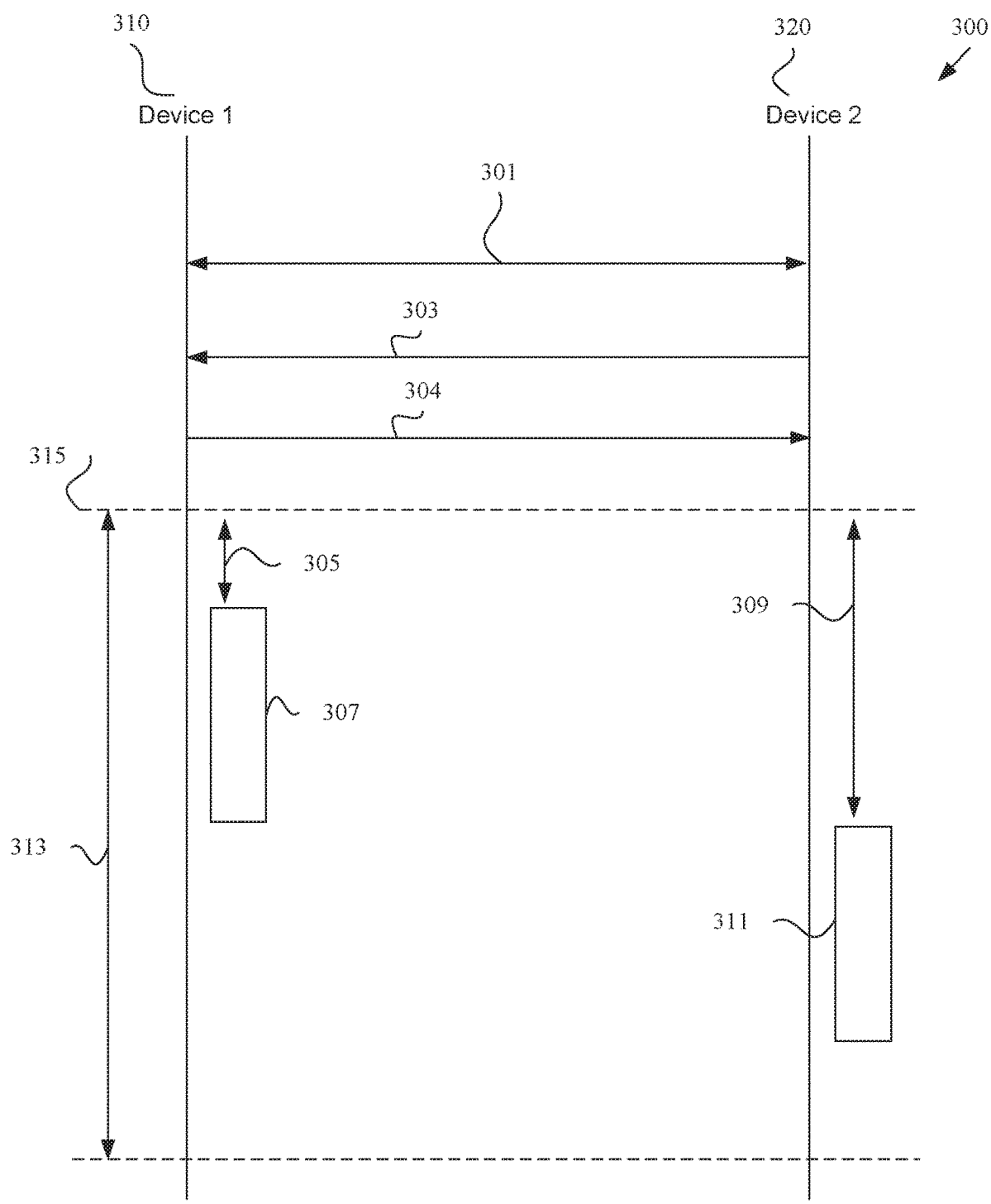
FIG. 3 illustrates one exemplary communication between a central device and a peripheral device to synchronize for short range communication protocol scan, according to some aspects of the disclosure.

FIG. 3 illustrates one exemplary communication 300 between central device 310 and peripheral device 320 to synchronize for short range communication protocol scan, according to some aspects of the disclosure. In this example, central device 310 can include central device 120a of FIG. 1 and peripheral device 320 can include peripheral device 120b or 120c of FIG. 1. Although some examples of synchronization for short range communication protocol scan across multiple devices are discussed with respect to central device 310 and peripheral device 320, the aspects of this disclosure are not limited to these devices and other devices in a group of devices can be configured to implement the synchronization step between the devices. Also, although exemplary communication 300 is discussed with respect to two devices, the aspects of this disclosure are not limited to these examples and can include any number of devices.

Exemplary communication 300 can be part of initial synchronization between central device 310 and peripheral device 320. Additionally, or alternatively, exemplary communication 300 can be part of re-synchronization (e.g., dynamic synchronization) between central device 310 and peripheral device 320.

According to some aspects, communication 300 between central device 310 and peripheral device 320 to synchronize these devices for short range communication protocol scan can include establishing connection between central device 310 and peripheral device 320. In some examples, establishing connection 301 can include central device 310 detecting the presence of peripheral device 320 based on, for example, messages (e.g., advertising messages) transmitted by the peripheral device 320. However, the aspects of this disclosure are not limited to this example, and central device 310 can detect the presence of peripheral device 320 using other methods and messages. It is noted that establishing connection 301 can be an optional step and central device 310 and peripheral device 320 can exchange information and parameters without establishing connection 301.

After establishing connection 301 or without establishing connection 301, central device 310 can receive one or more parameters from peripheral device 320 at 303. Central device 310 can determine one or more synchronization parameters based, at least, on the received one or more parameters from peripheral device 320 and/or one or more parameters of central device 310. Central device 310 can communicate the one or more synchronization parameters to peripheral device 320 at 304. After communicating the one or more synchronization parameters to peripheral device 320, central device 310 can disable the connection with peripheral device 320. In some examples, the connection between central device 310 and peripheral device 320 can include a short range connection (e.g., Bluetooth™), a cellular network connection, and/or a wireless local network connection. Alternatively, central device 310 and peripheral device 320 can exchange information and parameters without establishing connection 301 but by using one or more procedures associated with a short range protocol (e.g., Bluetooth™), a cellular network protocol, and/or a wireless local network protocol.

After the central device 310 and peripheral device 320 are synchronized by, for example, calculating and communicating the one or more synchronization parameters, central device 310 and peripheral device 320 can start their synchronized scanning. For example, as illustrated in FIG. 3, central device 310 and peripheral device 320 can use scan interval 313 to perform their synchronized scanning. In some examples, scan interval 313 can include a time period in which each of central device 310 and peripheral device 320 can have one scan window 307 and 311, respectively. Scan window 307 can include a time period during which central device 310 can scan for (e.g., "listen") for messages (e.g., advertising messages, pages, etc.) from other devices. In some examples, scan window 307 can be defined as a percentage of scan interval 313. Scan window 311 can include a time period during which peripheral device 320 can scan for (e.g., "listen") for messages (e.g., advertising messages, pages, etc.) from other devices. In some examples, scan window 311 can be defined as a percentage of scan interval 313.

In some examples, scan windows 307 and 311 can have the same duration. Alternatively, scan windows 307 and 311 can have different durations. In some examples, central device 310 can determine scan windows 307 and 311 based, at least, on the one or more parameters associated with central device 310 and/or the one or more parameters associated with peripheral device 320 received at 303.

As illustrated in FIG. 3, scan intervals 307 and 311 are synchronized by, for example at least, scan offsets 305 and 309. As discussed above, central device 310 can determine scan offsets 305 and 309 based, at least, on the one or more parameters associated with central device 310 and/or the one or more parameters associated with peripheral device 320 received at 303. Central device 310 can communicate one or more of scan offsets 305 and 309 during 304 to peripheral device 320. In one example, scan offset 305 can include time period from beginning 315 of scan interval 313 to beginning of scan window 307 of central device 310. In one example, scan offset 309 can include time period from beginning 315 of scan interval 313 to beginning of scan window 311 of peripheral device 320. In some examples, scan offsets 305 and 309 are determined such that the scan windows 307 and 311 do not overlap in time. By spreading scan windows 307 and 311 across central device 310 and peripheral device 320, central device 310 and peripheral device 320 can detect (and connect to) a remote device (e.g., device 110 of FIG. 1) faster and with using less energy and power. In other words, since central device 310 and peripheral device 320 do not scan at the same time, they can share the task of scanning for the remote device, which can result in power savings for central device 310 and peripheral device 320 and can decrease the time for finding and/or connecting to the remote device. In some examples, scan offsets 305 and 309 are determined such that the scan windows 307 and 311 overlap in time for a small period of time such that the spread of scan windows does not leave a gap in scan interval 313 not scanned.

Figure 4:
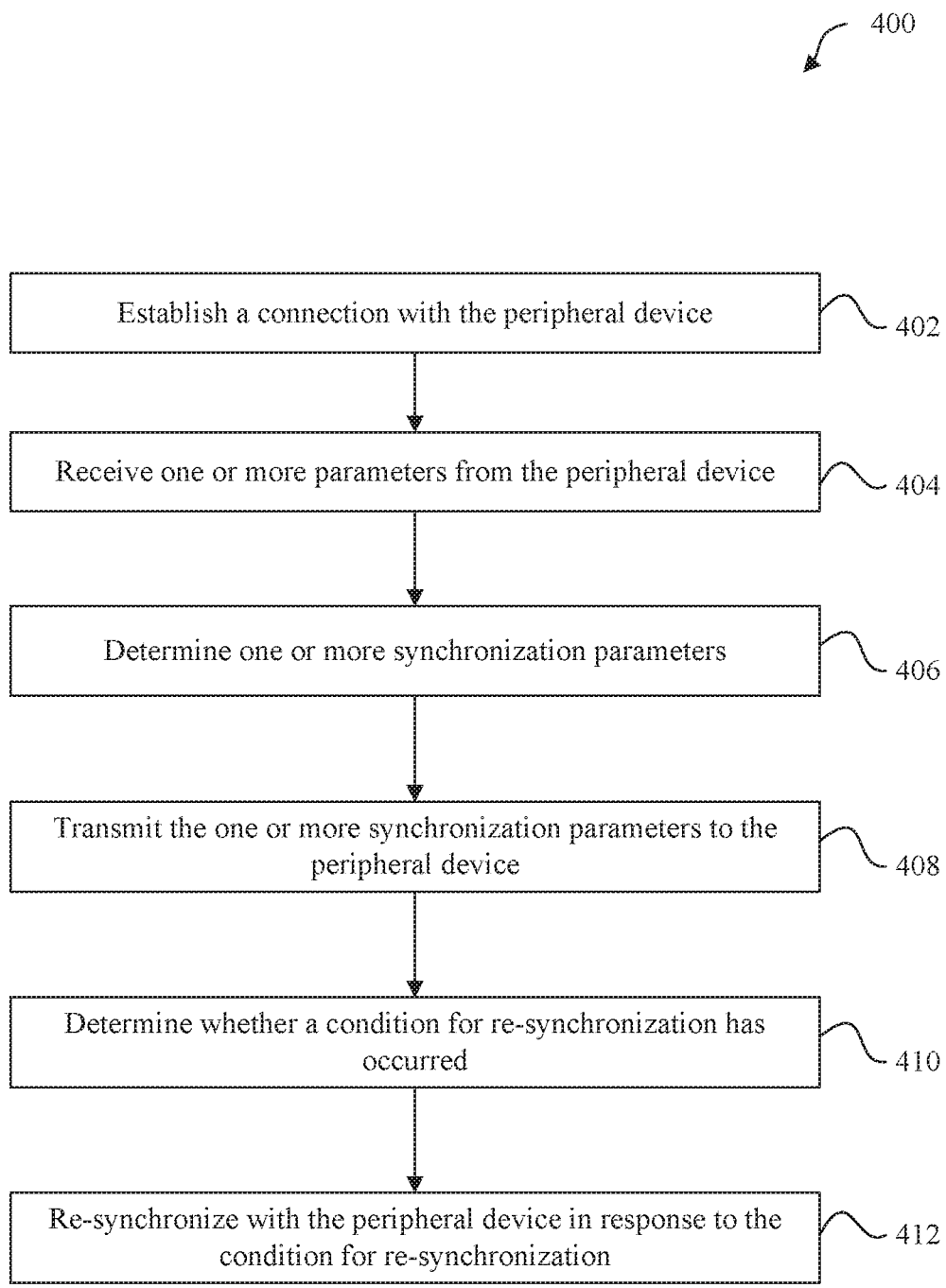
FIG. 4 illustrates an example method for a central device to synchronize with a peripheral device for short range communication protocol scan, according to some aspects of the disclosure.

FIG. 4 illustrates an example method 400 for a central device to synchronize with a peripheral device for short range communication protocol scan, according to some aspects of the disclosure. As a convenience and not a limitation, FIG. 4 may be described with regard to elements of FIGS. 1-3. Method 400 may represent the operation of an electronic device (e.g., a central device as discussed in this disclosure) implementing a synchronized short range communication scan mechanism across multiple devices. Method 400 may also be performed by system 200 of FIG. 2 and/or computer system 700 of FIG. 7. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

Exemplary method 400 can be part of initial synchronization between a central device (e.g., device 120*a* of FIG. 1 and/or device 310 of FIG. 3) and a peripheral device (e.g., device 120*b*/120*c* of FIG. 1 and/or device 320 of FIG. 3). Additionally, or alternatively, exemplary method 400 can be part of re-synchronization (e.g., dynamic synchronization) between the central device and the peripheral device.

At 402, a connection is established between the central device and the peripheral device. For example, central device 310 and peripheral device 320 establish connection 301 as discussed with respect to FIG. 3. It is noted that 402 can be optional and the central device and the peripheral device can exchange information and parameters without establishing a connection.

At 404, the central device receives one or more parameters from the peripheral device. According to some aspects, the one or more parameters can include, but is not limited to, peripheral device's usage indicator, peripheral device's power indicator, peripheral device's priority indicator, peripheral device's scan configuration, peripheral device's clock drift, and the like. It is noted that aspects of this disclosure are not limited to these examples, and the one or more parameters from the peripheral device can include less parameters and/or other parameters.

At 406, one or more synchronization parameters are determined. For example, the central device determines the one or more synchronization parameters. In some examples, the central device can determine the one or more synchronization parameters based, at least, on the one or more parameters received from the peripheral device, one or more parameters associated with the central device, or a combination thereof. In some examples, the one or more parameters associated with the central device can include, but is not limited to, central device's usage indicator, central device's power indicator, central device's priority indicator, central device's scan configuration, central device's clock drift, the number of devices in the group determined based on the policy, and the like.

According to some aspects, the one or more synchronization parameters can include a scan offset for each of the central and peripheral devices. Additionally, or alternatively, the one or more synchronization parameters can include one or more scan intervals. For example, the central device can determine one or more scan intervals for the central and peripheral devices. Alternatively, the central device can determine its scan interval and each of the peripheral devices determines its scan interval. In some examples, the scan intervals are the same for the central device and the peripheral device. In some examples, scan intervals are different for the central device and the peripheral device.

Additionally, or alternatively, the one or more synchronization parameters can include one or more scan windows. For example, the central device can determine one or more scan windows for the central device and the peripheral device. Alternatively, the central device can determine its scan window and each of the peripheral devices determines its scan window. In some examples, the scan windows are the same for the central device and the peripheral device. In some examples, scan windows are different for the central device and the peripheral device. In a non-limiting example, the scan window can be determined based at least on usage indicator. For example, a device with a high usage (e.g., a large usage indicator) can have a shorter scan window than a device with a low usage (e.g., a small usage indicator). In another example, a device with a high usage (e.g., a large usage indicator) can have a longer scan window than a device with a low usage (e.g., a small usage indicator). In some examples, peripheral devices are responsible to set their respective scan window and/or scan interval based on the scan offset to avoid their respective scan windows colliding with the scan window of the central device and/or other peripheral devices. In some examples, the one or more synchronization parameters can also include central device's clock drift.

At 408, the one or more synchronization parameters are transmitted. For example, the central device transmits the one or more synchronization parameters to the peripheral device such that the central device and the peripheral device can synchronize the scan mechanism between them.

According to some aspects, the synchronization between the central and peripheral devices (e.g., determining one or more synchronization parameters to synchronize the scan mechanism across the plurality of devices as discussed above) can include a dynamic synchronization. In other words, the central and peripheral devices can re-synchronize based, at least, on a predetermined condition. For example, at 410, it is determined whether one or more conditions for re-synchronization has occurred.

In a non-limiting example, the central and peripheral devices can perform the synchronization process discussed above at predetermined times. In one example, predetermined time periods can be used as the one or more conditions for re-synchronization. Alternatively, dynamically determined time periods can be used as the one or more conditions for re-synchronization. The re-synchronization process can be triggered by other conditions. In a non-limiting example, if one or more devices leaves the group of devices and/or one or more devices are added to the group of devices, the re-synchronization process can be triggered. In another non-limiting example, if the central device can no longer perform the synchronization and/or the re-synchronization process, another device in the group of devices can be selected as the central device and/or can perform the re-synchronization process. In another non-limiting example, if the one or more parameters of the central device and/or the peripheral devices change, the re-synchronization process can be triggered. The aspects of this disclosure are not limited to these examples and other conditions can be used for dynamic synchronization and re-synchronization between the group of devices.

If it is determined that the one or more conditions for re-synchronization has occurred, the re-synchronization process can be performed at 412. In some examples, the re-synchronization can include determining updated one or more synchronization parameters. According to some aspect, the central device can perform the re-synchronization process, which can include, for example, one or more of 402-408 of method 400. In another example, another device can perform the re-synchronization process, which can include, for example, one or more of 402-408 of method 400.

Figure 5:
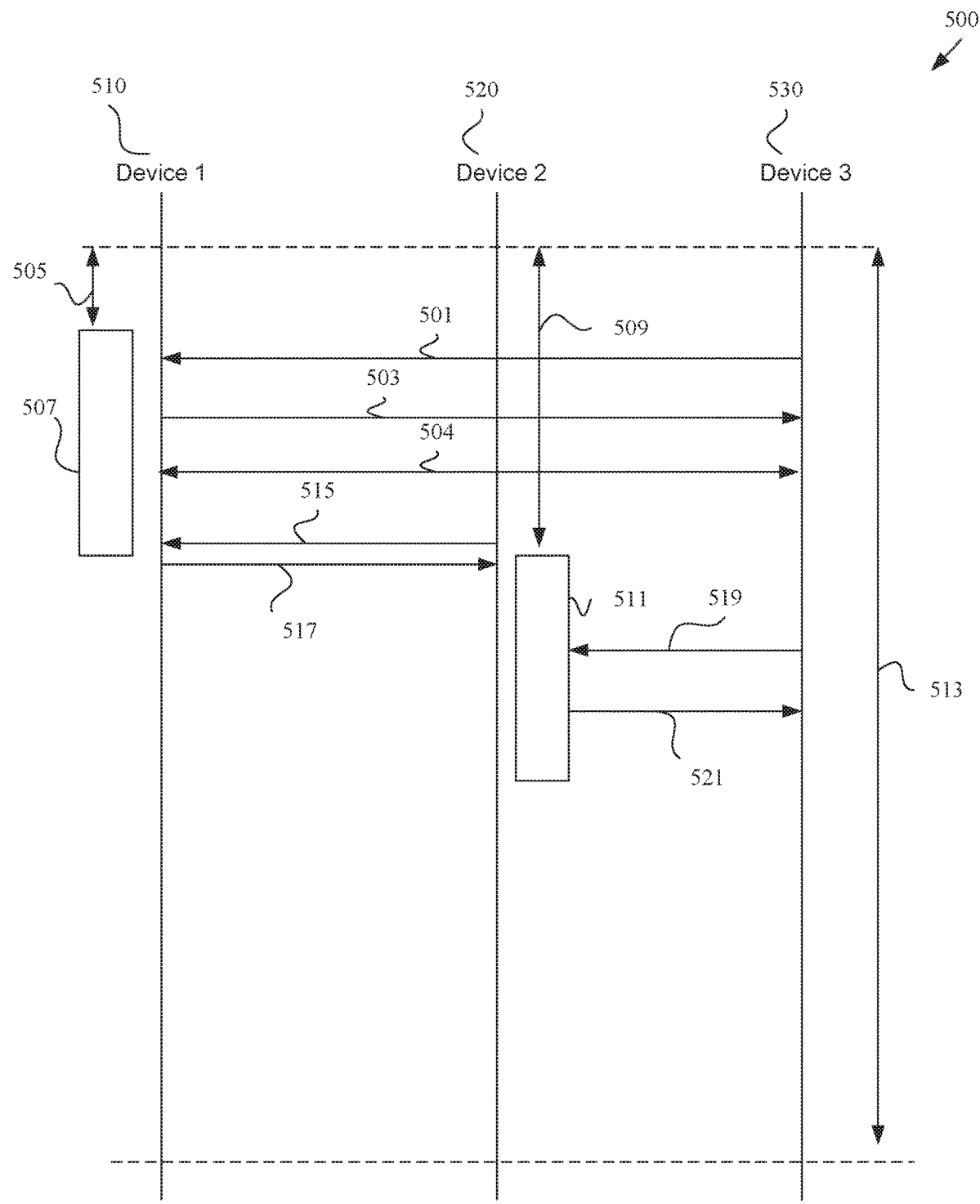
FIG. 5 illustrates one exemplary communication between synchronized central and peripheral devices with a remote device based on a short range communication protocol, according to some aspects of the disclosure.

FIG. 5 illustrates one exemplary communication 500 between synchronized central and peripheral devices with a remote device based on a short range communication protocol, according to some aspects of the disclosure. In this example, central device 510 can include central device 120a of FIG. 1 and/or central device 310 of FIG. 3. Peripheral device 520 can include peripheral device 120b or 120c of FIG. 1 and/or peripheral device 320 of FIG. 3. Remote device 530 can include device 110 of FIG. 1. Although some examples of synchronized short range communication protocol scan across multiple devices are discussed with respect to central device 510, peripheral device 520, and remote device 530, the aspects of this disclosure are not limited to these devices and other devices in a group of devices can be configured to implement the synchronized short range communication protocol scan. Also, although exemplary communication 500 is discussed with respect to three devices, the aspects of this disclosure are not limited to these examples and can include any number of devices.

Exemplary communication 500 can be performed after initial synchronization (or re-synchronization) between central device 510 and peripheral device 520, as discussed above, for example, with respect to FIGS. 3 and 4.

According to some aspects, after initial synchronization (or re-synchronization) process between central device 510 and peripheral device 520, central device 510 and peripheral device 520 can efficiently detect and connect to remote device 530. As a non-limiting examples, central device 510 can open its scan window 507 after scan offset 505 from the start of scan interval 513. As discussed above, at least scan offset 505 has been determined during the initial synchronization (or re-synchronization) process. During scan window 507, central device 510 can detect (e.g., receive and analyze) one or more advertising messages 501 from remote device 530 during its scan window. In some examples, detecting one or more advertising messages 501 can include a discovery process of a Bluetooth™ protocol, a Bluetooth™ Low Energy protocol, or a Bluetooth™ Low Energy Long Range protocol. During the discovery process, central device 510 can perform a passive scanning or an active scanning.

According to some aspects, after the discovery (e.g., advertising and scanning) process, central device 510 and remote device 530 can perform a connection process to establish a connection. In a non-limiting example, central device 510 can transmit one or more connection request messages 503 to establish connection 504 with remote device 530. It is noted that although the connection between central device 510 and remote device 530 are discussed as a connection based on a short range communication protocol, the aspects of this disclosure are not limited to these examples and the connection between central device 510 and remote device 530 can be based on other communication protocols.

Continuing with this examples, central device 510 can inform peripheral device 520 of the detection of remote device 530 and/or information associated with remote device 530 such that peripheral device 520 can more efficiently detect and/or connect to remote device 530. In one example, central device 510 can inform peripheral device 520 of the detection of remote device 530 and/or information associated with remote device 530 using one or more messages 517. In some examples, central device 510 can send the one or more messages 517 during scan window 511 of peripheral device 520. In this example, since central device 510 knows its scan offset 505, its scan window 507, peripheral device 520's scan offset 509, and/or peripheral device 520's scan window 511, such that central device 510 can determine when to send one or more messages 517. For example, central device 510 can determine advertisement interval associated with remote device 530. Then using, at least, the scan offsets and/or scan windows of peripheral device 520, central device 510 can share the advertisement interval associated with remote device 530 with peripheral device 520. In this example, peripheral device 520 can save power by optimally adjust the opening of its scan window 511 based on the information peripheral device 520 have received from central device 510 to receive, for example, advertising message(s) remote device 530.

Additionally, or alternatively, central device 520 can send one or more messages 517 in response to one or more messages 515 from peripheral device 515. In one example, one or more messages 515 can include information associated with scan offset 509 of peripheral device 520.

According to some aspects, by receiving information associated with remote device 530 from central device 510, peripheral device can determine when to detect (e.g., receive and analyze) one or more advertising messages 519 from remote device 530 during its scan window. As discussed above, information associated with remote device 530 can include advertisement interval associated with remote device 530 (e.g., one or more offsets between advertising messages, channel(s) associated with advertising message(s), and the like). In some examples, detecting one or more advertising messages 519 can include a discovery process of a Bluetooth™ protocol, a Bluetooth™ Low Energy protocol, or a Bluetooth™ Low Energy Long Range protocol. During the discovery process, peripheral device 520 can perform a passive scanning or an active scanning. According to some aspects, after the discovery (e.g., advertising and scanning) process, peripheral device 520 and remote device 530 can perform a connection process to establish a connection. In a non-limiting example, central device 510 can transmit one or more connection request messages 521 to establish the connection with remote device 530.

Figure 6:
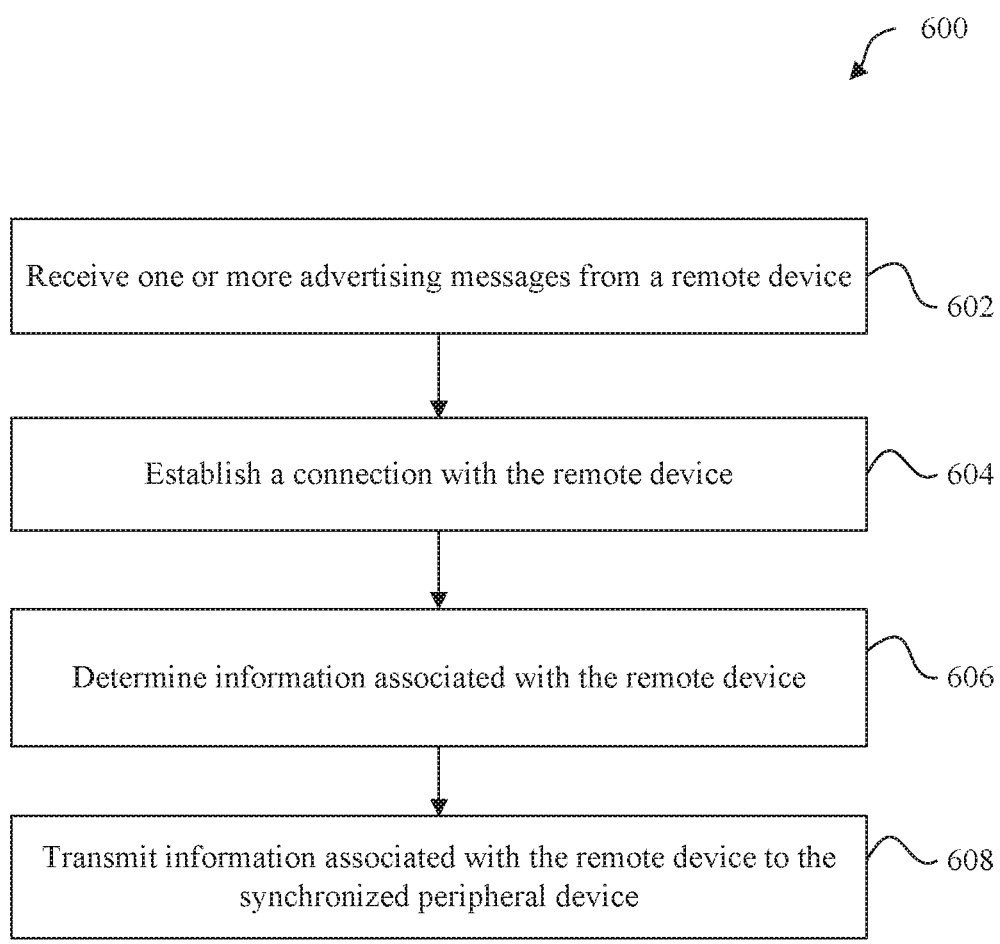
FIG. 6 illustrates an example method for communication between synchronized central and peripheral devices with a remote device based on a short range communication protocol, according to some aspects of the disclosure.

FIG. 6 illustrates an example method 600 for communication between synchronized central and peripheral devices with a remote device based on a short range communication protocol, according to some aspects of the disclosure. As a convenience and not a limitation, FIG. 6 may be described with regard to elements of FIGS. 1-5. Method 600 may represent the operation of an electronic device (e.g., a central device as discussed in this disclosure) implementing a synchronized short range communication scan mechanism across multiple devices. Method 600 may also be performed by system 200 of FIG. 2 and/or computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6.

Although method 600 is discussed with respect to the operation of a central device, the aspects of this disclosure are not limited to these examples and method 600 can be performed by a peripheral device.

At 602, one or more advertising messages from a remote device (e.g., a remote peripheral device) is received. For example, a central device, which is synchronized with a peripheral device, receives the one or more advertising messages from the remote device.

At 604, the central device can establish a connection with the remote device. Establish the connection can include the central device transmitting one or more connection request messages to the remote device. It is noted that although the connection is discussed as a connection based on a short range communication protocol, the aspects of this disclosure are not limited to these examples and the connection between the central device and the remote device can be based on other communication protocols.

At 606, information associated with the remote device and/or with the connection with the remote device can be determined. For example, before establishing the connection at 604, the central device can determine the information associated with the remote device. Additionally, or alternatively, the central device can determine the information associated with the remote device after establishing the connection. In some examples, the information associated with the remote device can include advertisement interval associated with the remote device (e.g., one or more offsets between advertising messages, channel(s) associated with advertising message(s), and the like).

At 608, the information associated with the remote device can be transmitted to a synchronized peripheral device. For example, the central device can inform the peripheral device of the detection of the remote device and/or the information associated with the remote device. Using this information, the peripheral device can more efficiently detect and/or connect to the remote device. In some examples, the central device can transmit the information associated with the remote device to the peripheral device based on the synchronization parameter(s) determined during the (re-)synchronization process and/or the parameter(s) the central device had received/receives from the peripheral device.

In some examples, the central device can send additional information or parameters to the synchronized peripheral device based on the information associated with the remote device. For example, the central device can change the duration of the scan window of the synchronized peripheral device based on the information associated with the remote device, and transmit the changed duration to the synchronized peripheral device. Additionally, or alternatively, the central device can move the scan window of the synchronized peripheral device (e.g., change the scan offset of the synchronized peripheral device) based on the information associated with the remote device, and transmit the changed scan offset to the synchronized peripheral device.

According to some aspects, using the received information associated with the remote device from the central device, the peripheral device can determine when to detect (e.g., receive and analyze) one or more advertising messages from the remote device. According to some aspects, after the discovery (e.g., advertising and scanning) process, the peripheral device and the remote device can perform a connection process to establish a connection.

Figure 7:
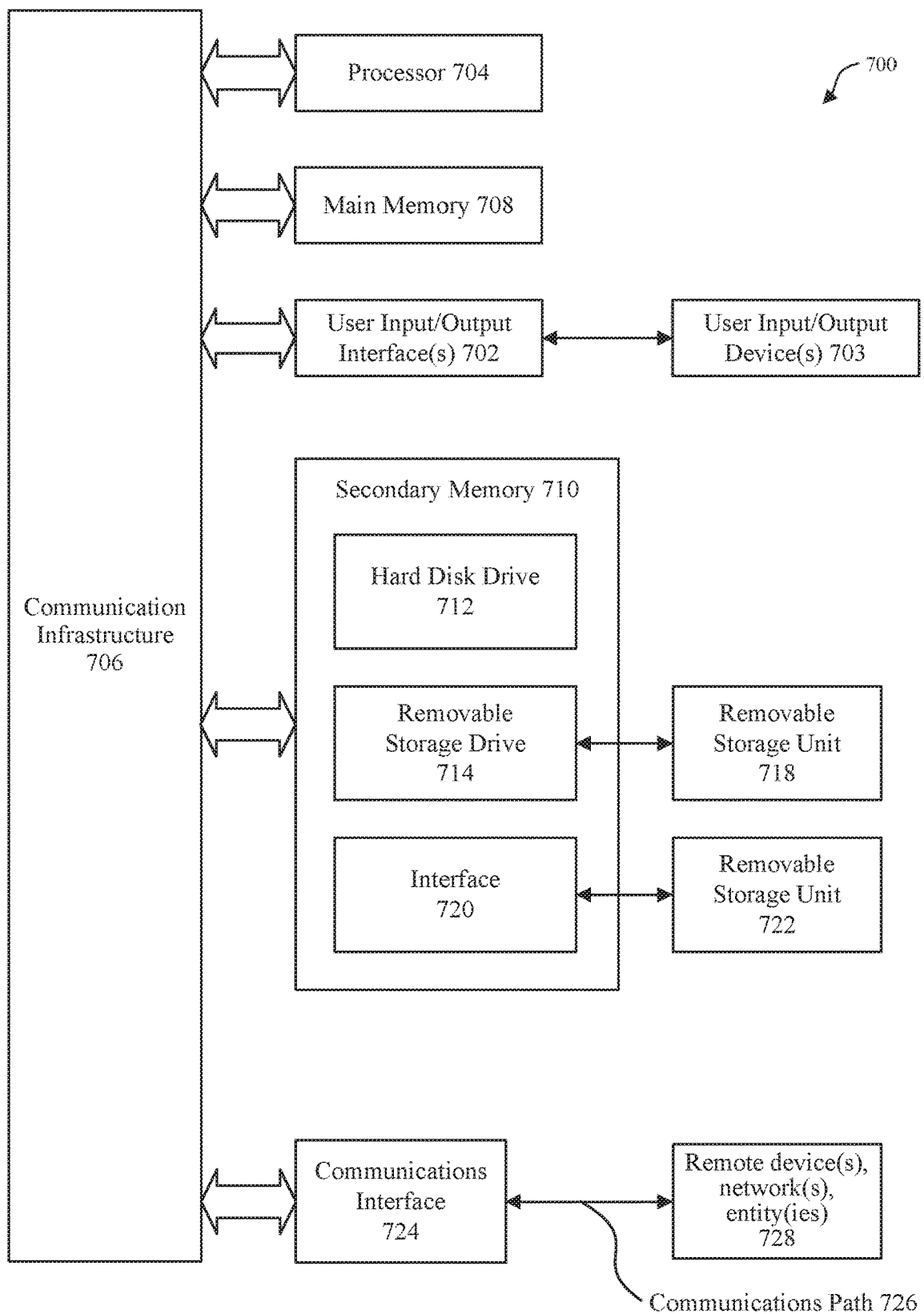
FIG. 7 is an example computer system for implementing some aspects or portion(s) thereof.

Various aspects can be implemented, for example, using one or more computer systems, such as computer system 700 shown in FIG. 7. Computer system 700 can be any well-known computer capable of performing the functions described herein such as devices 110, 120 of FIGS. 1, 200 of FIG. 2, 310, 320 of FIG. 3, 510, 520, 530 of FIG. 5. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "some aspects," "an example," "some examples" or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:
 a transceiver configured to communicate based on a short range communication protocol; and
 a processor communicatively coupled to the transceiver and configured to:
  receive one or more parameters from a peripheral electronic device;
  determine, based at least on the one or more parameters, one or more synchronization parameters; and
  transmit the one or more synchronization parameters to the peripheral electronic device, wherein the one or more synchronization parameters comprise at least a scan offset associated with the peripheral electronic device.

2. The electronic device of claim 1, wherein the one or more parameters comprise at least one of a usage indicator associated with the peripheral electronic device, a power indicator associated with the peripheral electronic device, a priority indicator associated with the peripheral electronic device, a scan configuration associated with the peripheral electronic device, or a clock drift associated with the peripheral electronic device.

3. The electronic device of claim 1, wherein to determine the one or more synchronization parameters, the processor is configured to:
 determine the one or more synchronization parameters based at least on the one or more parameters received from the peripheral electronic device and one or more parameters of the electronic device.

4. The electronic device of claim 1, wherein the scan offset associated with the peripheral electronic device comprises a time period measured from a beginning of a scan interval to a beginning of a scan window of the peripheral electronic device.

5. The electronic device of claim 1, wherein the one or more synchronization parameters further comprise at least one of a scan interval or a scan window.

6. The electronic device of claim 1, wherein the processor is further configured to:
 determine whether a condition for re-synchronization has occurred; and
 in response to determining that the condition has occurred, determine updated one or more synchronization parameters.

7. The electronic device of claim 1, wherein the processor is further configured to:
 receive, using the transceiver and during a scan window associated with the electronic device, one or more messages from a second electronic device;
 determine information associated with the second electronic device; and
 communicate the determined information with the peripheral electronic device.

8. The electronic device of claim 7, wherein:
 the one or more messages from the second electronic device comprise one or more advertising messages, and
 the information associated with the second electronic device comprises an offset between the one or more advertising messages.

9. The electronic device of claim 1, wherein the electronic device and the peripheral electronic device belong to a group of electronic devices determined based on a policy.

10. A method, comprising:
receiving, by an electronic device, one or more parameters from a peripheral electronic device;
determining, by the electronic device and based at least on the one or more parameters, one or more synchronization parameters; and
transmitting, by the electronic device, the one or more synchronization parameters to the peripheral electronic device,
wherein the one or more synchronization parameters comprise at least a scan offset associated with the peripheral electronic device, and
wherein the electronic device and the peripheral electronic device belong to a group of electronic devices determined based on a policy.

11. The method of claim 10, wherein the one or more parameters comprise at least one of a usage indicator associated with the peripheral electronic device, a power indicator associated with the peripheral electronic device, a priority indicator associated with the peripheral electronic device, a scan configuration associated with the peripheral electronic device, or a clock drift associated with the peripheral electronic device.

12. The method of claim 10, wherein the determining the one or more synchronization parameters comprises determining the one or more synchronization parameters based at least on the one or more parameters received from the peripheral electronic device and one or more parameters of the electronic device.

13. The method of claim 10, wherein the scan offset associated with the peripheral electronic device comprises a time period measured from a beginning of a scan interval to a beginning of a scan window of the peripheral electronic device.

14. The method of claim 10, further comprising:
determining whether a condition for re-synchronization has occurred; and
in response to determining that the condition has occurred, determining updated one or more synchronization parameters.

15. The method of claim 10, further comprising:
receiving, by the electronic device and during a scan window associated with the electronic device, one or more messages from a second electronic device;
determining information associated with the second electronic device; and
communicating the determined information with the peripheral electronic device.

16. The method of claim 15, wherein:
the one or more messages from the second electronic device comprise one or more advertising messages, and
the information associated with the second electronic device comprises an offset between the one or more advertising messages.

17. A non-transitory computer-readable medium storing instructions that, when executed by a processor of an electronic device, cause the processor to perform operations, the operations comprising:
receiving one or more parameters from a peripheral electronic device, wherein the one or more parameters comprise at least one of a usage indicator associated with the peripheral electronic device and/or a power indicator associated with the peripheral electronic device;
determining, based at least on the one or more parameters, one or more synchronization parameters; and
transmitting the one or more synchronization parameters to the peripheral electronic device, wherein the one or more synchronization parameters comprise at least a scan offset associated with the peripheral electronic device.

18. The non-transitory computer-readable medium of claim 17, the operations further comprising:
determining whether a condition for re-synchronization has occurred; and
in response to determining that the condition has occurred, determining updated one or more synchronization parameters.

19. The non-transitory computer-readable medium of claim 17, the operations further comprising:
receiving, during a scan window associated with the electronic device, one or more advertising messages from a second electronic device;
determining information associated with the second electronic device; and
communicating the determined information with the peripheral electronic device, wherein the information comprises an offset between the one or more advertising messages.

20. The non-transitory computer-readable medium of claim 17, wherein the electronic device and the peripheral electronic device belong to a group of electronic devices determined based on a policy.

* * * * *